United States Patent

[11] 3,579,201

[72] Inventor Frank J. Langley
Carlisle, Mass.
[21] Appl. No. 861,750
[22] Filed Sept. 27, 1969
[45] Patented May 18, 1971
[73] Assignee Raytheon Company
Lexington, Mass.

[54] METHOD OF PERFORMING DIGITAL COMPUTATIONS USING MULTIPURPOSE INTEGRATED CIRCUITS AND APPARATUS THEREFOR
5 Claims, 3 Drawing Figs.

[52] U.S. Cl. .......... 340/172.5
[51] Int. Cl. .......... G06f 1/00
[50] Field of Search .......... 340/172.5

[56] References Cited
UNITED STATES PATENTS

| | | | |
|---|---|---|---|
| 2,998,192 | 8/1961 | Florida | 235/164 |
| 3,416,139 | 12/1968 | Marx | 340/172.5 |
| 3,462,742 | 8/1969 | Miller et al. | 340/172.5 |
| 3,470,542 | 9/1969 | Trantanella | 340/172.5X |

OTHER REFERENCES

Cserhalmi, N. et al., Efficient Partitioning for the Batch-Fabricated Fourth Generation Computer, Fall Joint Computer Conference, 1968, pps. 857— 865.

*Primary Examiner*—Raulfe B. Zache
*Attorney*—Philip J. McFarland

ABSTRACT: A digital computer, exemplifying a method of organizing and controlling the elements of a general or special purpose computer, incorporating identical multipurpose integrated circuits in the control and/or arithmetic elements, each one of such circuits being responsive to the combination of commonly applied clock pulses and coded function signals and a unique enable signal. With such an arrangement, a basic design of such control and/or arithmetic elements may be changed to expand word length, memory capacity or instruction repertoire by connecting similar multipurpose integrated circuits to existing ones as required.

INVENTOR
FRANK J. LANGLEY

INVENTOR
FRANK J. LANGLEY

INVENTOR
FRANK J. LANGLEY

METHOD OF PERFORMING DIGITAL COMPUTATIONS USING MULTIPURPOSE INTEGRATED CIRCUITS AND APPARATUS THEREFOR

BACKGROUND OF THE INVENTION

This invention relates generally to digital computer technology and specifically to the design, fabrication and operation of digital computers in which integrated circuits are incorporated.

Any type of digital computer, whether general or special purpose, utilizes certain basic elements to manipulate data in performing any program for which the computer is designed. It has been standard practice to arrange and actuate such basic elements in the control and arithmetic elements of a computer in such a manner that each basic element could perform but a single function. Consequently, each one of the basic elements, and the control circuitry therefor, had to be individually designed. Obviously, then, if the design of such a computer were to be changed to expand such parameters as word length memory capacity or instruction repertoire, each one of the basic elements and the control circuitry affected by any such change would have to be redesigned.

Therefore, it is a primary object of this invention to provide an improved digital computer in which identical multipurpose integrated circuits are used in the control and/or arithmetic elements.

Another object of the invention is to provide a method of control of the identical multipurpose integrated circuits which enables simplified expansion of the computer's processing capacity.

Another object of this invention is to provide an improved digital computer in which the control and/or arithmetic elements, which incorporate identical multipurpose integrated circuits, sequentially perform the operations required by a given program, operation of each one of such circuits being determined by the simultaneous application of a specific enabling signal and a common function signal, the former being applied at any given time to a selected one of such circuits and the latter being applied to all such circuits.

Still another object of this invention is to provide, in accordance with the foregoing objects, an improved digital computer in which changes in word length, memory capacity and/or instruction repertoire may be easily made by adding, as required, similar multipurpose integrated circuits to existing ones of such circuits.

SUMMARY OF THE INVENTION

These and other objects of this invention are attained generally by providing, in either a general or special purpose digital computer, a plurality of indentical data processing units, each one thereof being adapted to perform any one of a number of functions, the particular function actually performed by each one of such units during the execution of a program being selectively controlled by signals having a portion applied to all such units and a portion applied only to a single one thereof.

BRIEF DESCRIPTION OF THE DRAWINGS

For a more complete understanding of this invention, reference is now made to the following description of a preferred embodiment and to the drawings, in which.

DESCRIPTION OF THE PREFERRED EMBODIMENTS

Figure 1:
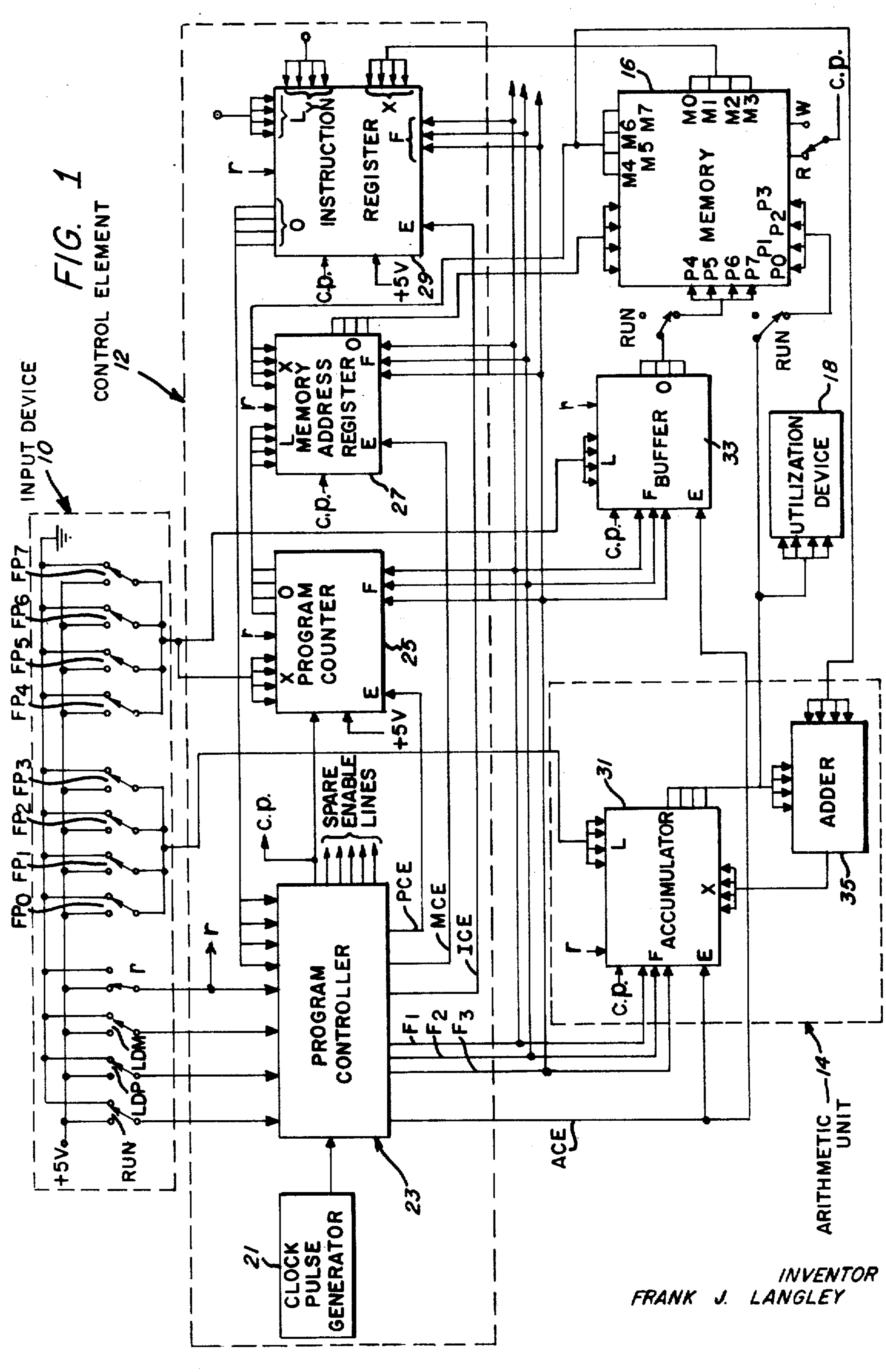
FIG. 1 is a block diagram of a simple digital computer according to this invention.

Before referring to the drawings, it will be noted that, for expository reasons, the multipurpose integrated circuit used in the control and arithmetic elements is a type AS–80 module of Raytheon Company, Lexington, Mass. This type module has been described in the literature "Efficient Partitioning for the Batch-Fabricated Fourth Generation Computer" by N. Cserhalmi, O. Lowenschuss and D. Scheff, 1968 Fall Joint Computer Conference. In brief, such a module is a 4-bit counter/register capable of operating in any one of eight mutually exclusive modes in response to a 3-bit binary code. The modes are: clear; shift right; shift left; load, hold; complement; count-up; and, count-down. It will become clear, however, that a computer according to this invention need not be limited to one using the type AS–80 module.

Referring now to FIG. 1, it will be first noted that the particular embodiment shown is one in which addition, or subtraction of positive numbers is illustrated, it being deemed unnecessary to complicate the drawings to illustrate other types of processing, as the processing of negative numbers or of the multiplication or division of numbers, in order to demonstrate the principles of this invention. Thus, in FIG. 1, a computer according to this invention comprises an input device 10, a control element 12, an arithmetic element 14, a memory 16 and a utilization device 18, all connected as shown, to evaluate the equation:

Eq. 1 $X+Y-Z$ where X, Y and Z are positive numbers and $X+Y>Z$

Input device 10 is here shown, for convenience, as including plurality of single-pole double-throw switches LDP (for "Load Program Register"), LDM (for "Load Memory Address Register"), *r* (for reset), $FP_{0-3}$(for operation code), $FP_{4-7}$ (for operand/memory address) and three ganged switches marked RUN. (For convenience two such switches are shown in the vicinity of memory 16.) As is obvious, these switches perform, when selectively operated, the conventional function of providing instruction signals and information signals required by the remaining portions of the computer by switching each associated line from ground (representative of "0") to a +5v. source, not shown, (representative of "1").

The control element 12 includes a clock pulse generator 21 of conventional construction, a program controller 23 (shown in detail in FIG. 2), a program counter register 25, a memory address register 27 and an instruction register 29. These three registers each here consist of a type AS–80 module. The possible connections to such a module are indicated in connection with the instruction register 29, it being understood that similarly lettered terminals on other type AS–80 modules used in the disclosed computer correspond to the connections shown in connection with instruction register 29. Thus, the AS–80 module has three inputs, X, Y (set to "0000" in the disclosed embodiment when L input is used), and L, each accepting a 4-bit parallel binary number, an output O for a 4-bit parallel binary number, a reset terminal *r*, a clock pulse terminal *c.p.*, an enable terminal E and function terminals F adapted to receive a 3-bit parallel binary number, a carry terminal *c.i.* as well as power terminals (not shown). The module will, upon application of a clock pulse on the clock pulse terminal *c.p.* and a signal to the enable terminal E simultaneously with a signal on the F terminals, perform the operation designated by the following table:

TABLE 1

| Function terminal "F": | Operation |
|---|---|
| 000 | Clear, or enter data from "L" input. |
| 001 | Shift contents, Left. |
| 010 | Shift contents, Right. |
| 011 | Enter data from "X". |
| 100 | Hold. |
| 101 | Complement. |
| 110 | Count down. |
| 111 | Count up. |

The arithmetic element 14 includes an accumulator 31 (which here is a type AS–80 module) and an adder 35. The latter may be any conventional binary 4-bit adder such as, for example, the one described in "Digital Computer Fundamentals" by T. C. Bartee (pg. 159) published by McGraw-Hill Book Company, Inc., New York, N.Y., 1960.

The memory 16 may be any conventional memory such as a core array. A buffer 33 (which also is a type AS-80 module) is connected between the memory 16 and switches $FP_{4-7}$ and may conveniently be considered as a part of memory 16. As shown, a single-pole double-throw switch (not numbered) is connected between an input terminal of the memory 16 and a clock pulse (*c.p.*) line. This switch, when moved from one of its positions to the other as indicated, conditions the memory 16 to operate in either its write or read mode. Further, it will be noted that, at each address in the memory 16, both the operation code ($FP_{0-3}$) and the operand/memory address ($FP_{4-7}$) may be written by energizing terminals $P_{0-7}$ and read from terminals $M_{0-7}$. The memory 16 is addressed by the signal from the memory address register 27 as shown. A utilization device 18, as an appropriately interfaced cathode-ray tube or a matrix of indicating lamps, is connected as shown to complete the illustrated computer.

Figure 2:
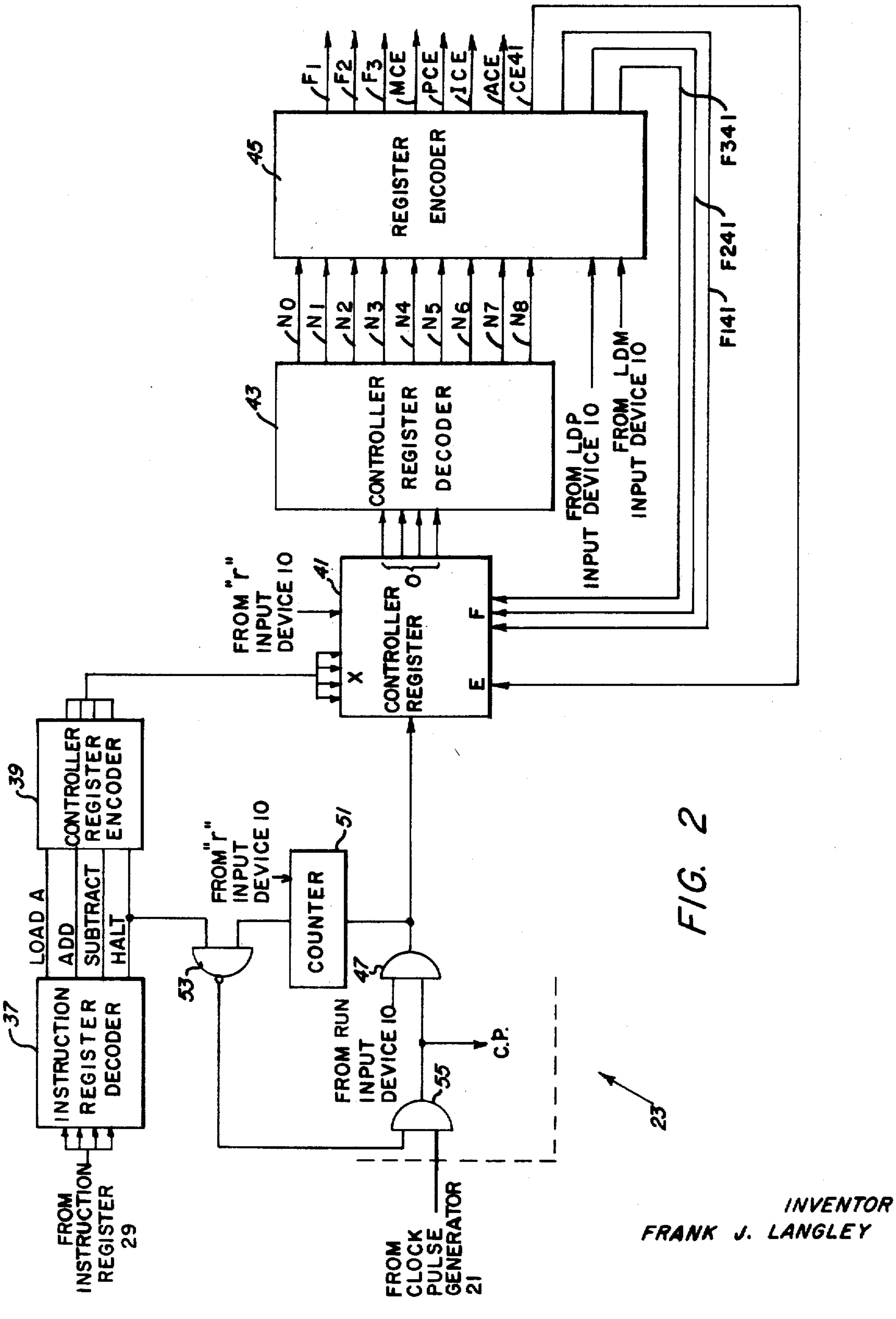
FIG. 2 is a block diagram of the program controller of FIG. 1.

Referring now to FIG. 2, a program controller adapted to control the evaluation of Eq. 1 is illustrated. It will be evident to a person of skill in the art that changes in the arrangement shown in FIG. 2 may be made to permit evaluation of other types of equations. Thus, the illustrated program controller 23 includes an instruction register decoder 37, a controller register encoder 39, a controller register 41, a controller register decoder 43, a register encoder 45 and an AND gate 47. In addition, the program controller 23 includes, because the operations "Halt" and "Clear" in the chosen program are both represented by the 4-bit binary number "0000," logic circuitry consisting of counter 51, NAND gate 53 and AND gate 55. This latter circuitry is required to prevent the output signal from the instruction register decoder 37 from inhibiting clock pulses at the beginning of the retrieval operation. A moment's thought will make it clear, however, that the coded signals for "Halt" and "Clear" need not be the same. If the signals differ, then the logic circuitry just described is unnecessary.

The instruction register decoder 37 which preferably is a conventional diode matrix decoder, receives a 4-bit binary number from the instruction address register 29 (FIG. 1) as indicated and produces a unique signal on one of four output lines as set forth in Table 2.

TABLE 2

| Instruction address register output: | Operation |
|---|---|
| 0000 | Halt. |
| 0001 | Add. |
| 0010 | Subtract. |
| 0011 | Load accumulator. |

The controller register encoder 39, which preferably is a diode matrix encoder, accepts the unique signal from the instruction register decoder 37 to produce a 4-bit binary number as set forth in Table 3.

TABLE 3

| Instruction register decoder: | Controller register encoder output |
|---|---|
| Halt | 0000 |
| Add | 0101 |
| Subtract | 0110 |
| Load accumulator | 0100 |

While it may appear to be unnecessary to decode the 4-bit binary number from the instruction register 29 and then encode the resulting signal back into a 4-bit binary number for application to the controller register 41, such manipulation is desirable according to the invention. In the first place, this decoding/encoding operation, in effect, isolates the X input terminals of the controller register 41 from the output terminals of the instruction register 29. That is, with such manipulation, the signals into the controller register 41 need not be the same as the signals out of the instruction register 29 but may be changed as desired. More important, perhaps, is the fact that the decoding/encoding operation permits greater flexibility in design of a computer according to this invention. Thus, as is exemplified by the connection to the "Halt" line between the instruction register decoder 37 and the controller register encoder 39, the decoding/encoding operation permits the generation of ancillary control signals for auxiliary equipment (not shown).

The controller register 41, which preferably is a type AS-80 module, accepts the 4-bit binary number from the controller register encoder 39 as indicated. When a clock pulse is applied and he module is enabled, such number is processed, in accordance with the function signal applied to the F terminals, according to Table 1. It is noted here that clock pulses are applied to the controller register 41 only when AND gate 47 is enabled; i.e., during retrieval of a program.

The 4-bit binary number from the controller register 41 is applied to the controller register decoder 43, which preferably is a conventional diode matrix decoder, to produce a unique signal on one of nine output lines as indicated in Table 4.

TABLE 4

| Controller register output: | Controller register decoder output |
|---|---|
| 0000 | $N_0$ |
| 0001 | $N_1$ |
| 0010 | $N_2$ |
| 0011 | $N_3$ |
| 0100 | $N_4$ |
| 0101 | $N_5$ |
| 0110 | $N_6$ |
| 0111 | $N_7$ |
| 1000 | $N_8$ |

The output lines from the controller register decoder 43, along with the LDP and LDM lines from the input device 10, are led to the register encoder 45, which preferably is a conventional diode matrix encoder, to produce signals at the output terminals thereof according to Table 5.

TABLE 5

| | $F_1$ | $F_2$ | $F_3$ | MCE | PCE | ICE | ACE | $F_{141}$ | $F_{241}$ | $F_{341}$ | $CE_{41}$ |
|---|---|---|---|---|---|---|---|---|---|---|---|
| $N_0$ | 0 | 0 | 0 | 1 | 0 | 0 | 0 | 1 | 1 | 1 | 1 |
| $N_1$ | 1 | 1 | 1 | 0 | 1 | 0 | 0 | 1 | 1 | 1 | 1 |
| $N_2$ | 0 | 1 | 1 | 1 | 0 | 1 | 0 | 1 | 1 | 1 | 1 |
| $N_3$ | 0 | 1 | 1 | 0 | 0 | 0 | 0 | 0 | 1 | 1 | 1 |
| $N_4$ | 0 | 0 | 0 | 0 | 0 | 0 | 1 | 1 | 1 | 1 | 1 |
| $N_5$ | 0 | 1 | 1 | 0 | 0 | 0 | 1 | 0 | 0 | 0 | 1 |
| $N_6$ | 1 | 0 | 1 | 0 | 0 | 0 | 1 | 1 | 1 | 1 | 1 |
| $N_7$ | 0 | 1 | 1 | 0 | 0 | 0 | 1 | 1 | 1 | 1 | 1 |
| $N_8$ | 1 | 0 | 1 | 0 | 0 | 0 | 1 | 0 | 0 | 0 | 1 |
| LDP | 0 | 1 | 1 | 0 | 1 | 0 | 0 | 0 | 0 | 0 | 0 |
| LDM | 0 | 0 | 0 | 1 | 0 | 0 | 1 | 0 | 0 | 0 | 0 |

In table 5, the signals on the lines marked $F_1$, $F_2$, $F_3$ together make up a first 3-bit function code (as set forth in Table 1); $F_{141}$, $F_{241}$, $F_{341}$ together make up a second 3-bit function code (also as set forth in Table 1); and a "one" in any of the columns marked MCE (meaning memory address register clock enable), PCE (program counter register clock enable), ICE (instruction register clock enable), ACE (accumulator clock enable) and $CE_{41}$ (controller register clock enable) each represents an enable signal to the corresponding element in FIGS. 1 and 2. Rewriting Table 5 in the light of Table 1, then, produces the following:

TABLE 6

| | Function | Clock enable | Controller register function |
|---|---|---|---|
| $N_0$ | Clear | Memory address register | Count up. |
| $N_1$ | Count up | Program counter register | Do. |
| $N_2$ | Load X | Instruction register and memory address register. | Do. |
| $N_3$ | do | | Load X. |
| $N_4$ | Clear | Accumulator | Count up. |
| $N_5$ | Load X | do | Clear. |
| $N_6$ | Complement | do | Count up. |
| $N_7$ | Load X | do | Do. |
| $N_8$ | Complement | do | Clear. |
| LDP | Load X | Program counter register | |
| LDM | Clear | Memory address register and accumulator and buffer. | |

It is noted here that the controller register is enabled except when the LDP or LDM line is actuated.

Referring again to FIG. 1, it may be seen that the function lines $F_1$, $F_2$, $F_3$ from the program controller 23 are connected to the function input terminals of the program counter register 25, the memory address register 27, the instruction register 29, the accumulator 31 and the buffer 33. It will be observed that a separate enable line (PCE, MCE, ICE) is connected to each one of such registers and a separate enable line (ACE) is connected to the accumulator 31 and the buffer 33. It is evident, therefore, that, even though a "function code" signal is simultaneously applied to all such elements, only those to which an "enable" signal has also been applied will operate in response to a clock pulse. It will also be observed that, because a 4-bit binary number is used here in the program controller 23, the register decoder 43 could be expanded to have up to 16 different output lines rather than the nine output lines necessary for the illustrated embodiment. The signals on such additional lines may be used as "function code" or "enable" signals as required to expand the computer. For example, if it is desired to expand the arithmetic element 14, additional AS–80 modules may be utilized, each one of such modules having its F terminals connected to lines $F_1$, $F_2$, $F_3$ and its E terminal connected to one of the spare enable lines shown in FIG. 1. Thus, without requiring any design changes other than expansion of the conventional decoders and encoders in the program controller 23, the arithmetic element 14 may be modified by adding AS–80 modules to perform functions other than simple addition and subtraction as illustrated. It will be observed that the technique of using two AS–80 units in the arithmetic element 14 may also be applied to the various registers to expand the word length of information processable by a computer according to this invention. Thus, for example, 8-bit words may be handled by adding an AS–80 unit in tandem with each register shown in the manner illustrated in the arithmetic element 14.

The operation of the invention will be demonstrated by evaluating the Equation 1. Because of the configuration adopted for explanatory purposes, the following limitations apply: (1) X, Y and Z must be positive numbers, (2) the numbers must be represented by no more than four binary bits, (3) Z must be less than X+Y. The solution of Equation 1 may be programmed as follows:

| Memory address | Instruction | Comment |
|---|---|---|
| 0 | LOAD A | 4 Load accumulator with number in memory address 4. |
| 1 | ADD | 5 Add number in accumulator to number in memory address 5. |
| 2 | SUB | 6 Subtract number in memory address 6 from accumulator. |
| 3 | HLT | Halt—stop clock. |
| 4 | | Binary of X. |
| 5 | | Binary of Y. |
| 6 | | Binary of Z. |

An instruction code must be assigned to all instructions anticipated by the program. The code is a 4-bit binary number, and in this demonstration the following codes are assigned:

| | |
|---|---|
| HLT | 0000 |
| ADD | 0001 |
| SUB | 0010 |
| LOAD A | 0011 |

ENTRY OF PROGRAM INTO MEMORY

Step 1. The switches in the input device 10 are set as shown. The reset switch is actuated and then the LDP switch of the input device 10 is actuated to pass an initiating signal (here a +5 VDC signal) to the program controller 23. This signal is coded by the register encoder 45 into a "load X" function code signal and a clock enable signal to the program counter register 25. On occurrence of a clock pulse, the program counter register 25 is loaded with the signal at switches $FP_{4-7}$ (or 0000).

Step 2. The LDM switch is actuated in the input device 10 and a +5 VDC signal is transmitted to the register encoder 45. This signal is coded by the register encoder 45 into a "clear" code signal and a clock enable signal to the memory address register 27, the accumulator 31 and the buffer 33. This results in the memory address register 27 accepting the 4-bit binary number contained in the program counter register 25, that is 0000. The accumulator 31 and the buffer 33 are now in a condition to accept a binary number from the input device 10.

Step 3. The memory 16 is put into a write condition by any convenient means as by moving the memory mode switch (not numbered). Switches $FP_{0-3}$ are set to 0011 and switches $FP_{4-7}$ are set to 0100, thereby impressing a "Load A" signal on the L terminals of the accumulator 31 and an "Address 4" signal on the L terminal of the buffer 33. On the next clock pulse, these signals are stored into memory at the memory address directed by the memory address register, that is 0000. This two-step procedure is followed until all program instructions and digital words to be processed are entered into the memory 16. The memory condition can be represented by Table 7.

TABLE 7

| Memory address (Memory address register 27) | $M_0$ | $M_1$ | $M_2$ | $M_3$ | $M_4$ | $M_5$ | $M_6$ | $M_7$ | |
|---|---|---|---|---|---|---|---|---|---|
| 0000 | 0 | 0 | 1 | 1 | 0 | 1 | 0 | 0 | LDA 4 |
| 0001 | 0 | 0 | 0 | 1 | 0 | 1 | 0 | 1 | ADD 5 |
| 0010 | 0 | 0 | 1 | 0 | 0 | 1 | 1 | 0 | SUB 6 |
| 0011 | 0 | 0 | 0 | 0 | 0 | 0 | 0 | 0 | HLT |
| 0100 | 0 | 0 | 0 | 0 | Binary of X | | | | |
| 0101 | 0 | 0 | 0 | 0 | Binary of Y | | | | |
| 0110 | 0 | 0 | 0 | 0 | Binary of Z | | | | |

RETRIEVAL OF PROGRAM

Step 1. Switch *r* in the input device 10 is actuated, transmitting a reset signal to registers 25, 27, 29, 41, the accumulator 31, the buffer 33 and the counter 51 to reset all those elements.

Step 2. The Run switch is actuated in the input device 10, transmitting a logic "one" signal to initiate operation of the program controller 23. This signal enables AND gate 47, permitting clock pulse signals to be applied to the controller register 41.

Step 3. The controller register 41 had been reset to 0000 by the reset signal (Step 1). The controller register decoder 43 therefore activated the $N_0$ line (Table 4). This $N_0$ signal, on transmittal to the register encoder 45, sets up a function code signal ($F_1$, $F_2$, $F_3$) of 000, or clear; a clock enable signal to the memory address register 27, a controller register function code signal ($F_{141}$, $F_{241}$, $F_{341}$) of 111, or count-up, and a clock enable signal CE41 to the controller register 41. Consequently, when a clock pulse is transmitted to all the registers, only the controller register 41 and the memory address register 27 will respond. Their condition thereby changes to:

Controller Register 0001

Memory Address Register 0000 (that is, the contents of the Program Counter Register via the L inputs.)

Step 4. Since the controller register 41 contains 0001, the $N_1$ line of the controller register decoder 43 (Table 4) is activated and the register encoder 45 transmits the following signals (Table 5):

| $F_1$ | $F_2$ | $F_3$ | Clock enable to register: | $F_{141}$ | $F_{241}$ | $F_{341}$ |
|---|---|---|---|---|---|---|
| 1 | 1 | 1 (Count up) | Program counter | 1 | 1 | 1 (Count up) |

Therefore, (*a*) the program counter register 25 changes to 0001 and (*b*) the controller register 41 changes to 0010 on the next clock pulse.

Step 5. Since the controller register 41 contains 0010, the controller register decoder 43 transmits the following signals:

| $F_1$ | $F_2$ $F_3$ | Clock enable to register: | $F_{141}$ $F_{241}$ $F_{341}$ |
|---|---|---|---|
| 011 | (Load X) | Memory address instruction | 111 (Count up) |

the next clock pulse:

a. the memory address register 27 responds to the "load X" signal and accepts signals $M_{4-7}$ from the memory, 16, at he memory address previously indicated by the memory address register 27. This address was established in Step 3, as 0000. The bits in this memory address from Table 7 are 0100:

b. the instruction register 29 responds to the "load X" signal and accepts signals $M_{0-3}$ from the memory 16, at the memory address indicated by the memory address register 27. This was established in Step 3 as 0000. The bits in this address from Table 7 are 0011;

c. the controller register 41 responds to a "count-up" signal and its state changes to 0011.

Step 6. Since the controller register 41 contains 0011, the register encoder 45 transmits the following signals (Table 5):

| $F_1$ | $F_2$ | $F_3$ Clock enable to register: | $F_{141}$ | $F_{241}$ | $F_{341}$ |
|---|---|---|---|---|---|
| 011 | | | 011 | | |

On next clock pulse:

a. the memory address register 27 does not change because it does not receive a clock enable signal;

b. the instruction register does not change because it does not receive a clock enable signal;

c. the controller register 41 responds to a "load X" signal. The contents of this register are determined by the instruction register decoder 37. The instruction register 29 contains, from Step 5(*b*), 0011. Therefore, the instruction register decoder 37 activates the Load A line. This load A signal is coded by the controller register encoder 39 to 0100 which signal is now loaded into the controller register 41.

Step 7. Because the controller register 41 contains 0100, the register encoder 45 transmits the following signals:

| $F_1$ | $F_2$ | $F_3$ Clock enable to register: | $F_{141}$ | $F_{241}$ | $F_{341}$ |
|---|---|---|---|---|---|
| 000 | | Accumulator | 111 | | |

On next clock pulse:

a. the accumulator 31 responds to a clear signal and its contents become 0000;

b. the controller register 41 responds to a count-up signal and its contents become 0101.

Step 8. Because the controller register 41 contains 0101, the register encoder 45 transmits the following signals:

| $F_1$ | $F_2$ | $F_3$ Clock enable to register: | $F_{141}$ | $F_{241}$ | $F_{341}$ |
|---|---|---|---|---|---|
| 011 | | Accumulator | 000 | | |

On next clock pulse:

a. the accumulator 31 responds to the "load X" signal and is loaded with the output signal from the adder 35. At this time the output signal of the latter is the binary sum of the accumulator 31 (that is, 0000) and the output signal of the memory 16 at terminals $M_{4-7}$ at the memory address selected by the memory address register 27 (which here is memory address 05). In other words, the binary of X in Equation 1 is applied to the adder 35;

b. the controller register 41 responds to a clear signal and its contents become 0000.

Step 9. Because the controller register 41 is 0000, the register encoder 45 transmits the following:

| $F_1$ | $F_2$ | $F_3$ Clock enable to register: | $F_{141}$ | $F_{241}$ | $F_{341}$ |
|---|---|---|---|---|---|
| 000 | | Memory address | 111 | | |

On next clock pulse:

a. the memory address register 27 is loaded with the contents of the program counter register 25, that is, from Step 4, that is 0001;

b. the controller register 41 responds to a count-up signal and its state changes to 0001.

Step 10. Because the controller register 41 contains 0001, the register encoder 45 transmits the following signals:

| $F_1$ | $F_2$ | $F_3$ Clock enable to register: | $F_{141}$ | $F_{241}$ | $F_{341}$ |
|---|---|---|---|---|---|
| 111 | | Program counter | 111 | | |

On next clock pulse:

a. the program counter 25 responds to the count-up signal and its state changes to 0010;

b. the controller register 41 responds to a count-up signal and its state changes to 0010.

Step 11. Because the controller register 41 contains 0010, the register encoder 45 transmits the following signals:

| $F_1$ | $F_2$ | $F_3$ Clock enable to register: | $F_{141}$ | $F_{241}$ | $F_{341}$ |
|---|---|---|---|---|---|
| 011 | | Memory address instruction | 111 | | |

On next clock pulse:

a. the memory address register 27 responds to the "load X" signal from the memory, 16, $M_{4-7}$ at the memory address previously selected by the memory address register. This address was established in Step 9*a*, that is 0001. The signals $M_{4-7}$ in memory at this address from Table 7 are 0101;

b. the instruction register 29 responds to the "load X" signal and accepts signals $M_{0-3}$ from memory, 16, at the same memory address. The signals $M_{0-3}$ in this address from Table 7 are 0001;

c. the controller register 41 responds to a count-up signal and its state changes to 0011.

Step 12. Because the controller register 41 contains 0011, the register encoder 45 transmits the following signals:

| $F_1$ | $F_2$ | $F_3$ Clock enable to register: | $F_{141}$ | $F_{241}$ | $F_{341}$ |
|---|---|---|---|---|---|
| 011 | | | 011 | | |

On the next clock pulse:

a. the memory address register 27 does not change because it does not receive a clock enable signal;

b. the instruction register 29 does not change for the same reason;

c. the controller register 41 responds to a "load X" signal. The signals on the X terminals of the register are determined by the instruction register decoder 37. Because the instruction register 29 output signal is 0001, the ADD line out of the instruction register decoder 37 is energized. This signal is coded by the controller register encoder 39 to 0101, which is the binary number applied to the X terminals of the controller register 41.

Step 13. Since the controller register 41 contains 0101, the register encoder 45 transmits the following signals:

| $F_1$ | $F_2$ | $F_3$ Clock enable to register: | $F_{141}$ | $F_{241}$ | $F_{341}$ |
|---|---|---|---|---|---|
| 011 | | Accumulator | 000 | | |

On the next clock pulse:

a. the accumulator 31 responds to a "load X" signal and is loaded with the output of the adder 35. The adder 35 contains the sum of the contents in the accumulator 31 (which is the binary representation of X) and signals $M_{4-7}$ of the memory 16 at the memory address (here 0101) selected by the memory address register 27.

From Table 7, signals $M_{4-7}$ taken together are the binary representation of Y. Therefore, the binary equivalent of X+Y is entered into the accumulator 31;

b. the controller register 41 responds to a "clear" signal and its contents change to 0000.

Step 14. Because the controller register 41 contains 0000, the register encoder 45 transmits the following signals:

| $F_1$ | $F_2$ | $F_3$ Clock enable to register: | $F_{141}$ | $F_{241}$ | $F_{341}$ |
|---|---|---|---|---|---|
| 000 | | Memory address | 111 | | |

On the next clock pulse:

a. the memory address register 27 is loaded with the contents of the program counter register 25, that is, from Step 10, 0010;

b. the controller register 41 responds to a count-up signal and its state changes to 0001.

Step 15. Because the controller counter register 41 contains 0001, the register encoder 45 transmits the following signal:

| $F_1$ | $F_2$ | $F_3$ | Clock enable to register: | $F_{1\cdot11}$ | $F_{2\cdot11}$ | $F_{3\cdot11}$ |
|---|---|---|---|---|---|---|
| 111 | | | Program counter | 111 | | |

On the next clock pulse:
a. the program counter register 25 responds to the count-up signal and its state changes to 0011;
b. the controller register 41 responds to a count-up signal and its state changes to 0010.

Step 16. Because the controller register 41 contains 0010, the register encoder 45 transmits the following signal:

| $F_1$ | $F_2$ | $F_3$ | Clock enable to register: | $F_{1\cdot11}$ | $F_{2\cdot11}$ | $F_{3\cdot11}$ |
|---|---|---|---|---|---|---|
| 011 | | | Memory address instruction | 111 | | |

On the next clock pulse:
a. the memory address register 27 responds to the "load X" signal and accepts the signals $M_{4-7}$ from memory 16 contained in the memory address previously selected by the memory address register 27. This address was established in Step 14*a*, that is, 0010. The binary number in memory at this address from Table 7 is 0110;
b. instruction register 37 responds to the "load X" signal and accepts the binary number of the instruction contained in memory at the same address. From Table 7 the number is 0010;
c. the controller register 41 responds to a count-up signal and its state changes to 0011.

Step 17. Because the controller register 41 contains 0011, the register encoder 45 transmits the following signal:

| $F_1$ | $F_2$ | $F_3$ | Clock enable to register: | $F_{1\cdot11}$ | $F_{2\cdot11}$ | $F_{3\cdot11}$ |
|---|---|---|---|---|---|---|
| 011 | | | | 011 | | |

On the next clock pulse:
a. the memory address register 27 does not change since it does not receive a clock enable signal;
b. the instruction register 29 does not change for the same reason;
c. the controller register 41 responds to a "load X" signal. The contents of this register are determined by the instruction register decoder 39. The instruction register contains from Step 16*b* 0010. Therefore, the instruction register decoder 37 activates the "Sub" line. This signal is coded by the controller register encoder 39 to 0110 which is applied to the X terminals of the controller register 41.

Step 18. Because the controller register 41 contains 0110, the register encoder 45 transmits the following signals:

| $F_1$ | $F_2$ | $F_3$ | Clock enable to register: | $F_{1\cdot11}$ | $F_{2\cdot11}$ | $F_{3\cdot11}$ |
|---|---|---|---|---|---|---|
| 101 | | | Accumulator | 111 | | |

On the next clock pulse:
a. the accumulator 31 responds to such complement signal and its contents (which are the binary sum of $X\Sigma Y$) now contain $\overline{X\Sigma Y}$;
b. the controller register 41 responds to a count-up signal and its contents become 0111.

Step 19. Because the controller register 41 contains 0111, the register encoder 45 transmits the following signals:

| $F_1$ | $F_2$ | $F_3$ | Clock enable to register: | $F_{1\cdot11}$ | $F_{2\cdot11}$ | $F_{3\cdot11}$ |
|---|---|---|---|---|---|---|
| 011 | | | Accumulator | 111 | | |

On the next clock pulse:
a. the accumulator 31 responds to a "load X" signal. This loads the accumulator 31 with the contents of the adder 35. The adder 35 contains the sum of the contents in the accumulator (which from Step 18*a* is $\overline{X\Sigma Y}$ and the signals $M_{4-7}$ from the memory 16 at the memory address selected by the memory address register. From Step 16*a*, the memory address register 27 selects 0110. From Table 7 signals $M_{4-7}$ are the binary representation of Z. Therefore, the binary equivalent of $(\overline{X\Sigma Y})\Sigma Z$ is entered into the accumulator 31;
b. the controller register 41 responds to a count-up signal and its contents change to 1000.

Step 20. Because the controller register 41 contains 1000, the register encoder 45 transmits the following signals:

| $F_1$ | $F_2$ | $F_3$ | Clock enable to register: | $F_{1\cdot11}$ | $F_{2\cdot11}$ | $F_{3\cdot11}$ |
|---|---|---|---|---|---|---|
| 101 | | | Accumulator | 000 | | |

On the next clock pulse:
a. the accumulator 31 responds to the complement signal. The contents of the accumulator 31 (from Step 19, $(\overline{X\Sigma Y})\Sigma Z$) become $\overline{X\Sigma Y\Sigma Z}$. This is the evaluation of Equation 1;
b. the controller register 41 responds to a clear signal and its contents become 0000.

Step 21. Because the controller register 41 contains 0000, the register encoder 45 transmits the following signal:

| $F_1$ | $F_2$ | $F_3$ | Clock enable to register: | $F_{1\cdot11}$ | $F_{2\cdot11}$ | $F_{3\cdot11}$ |
|---|---|---|---|---|---|---|
| 000 | | | Memory address | 111 | | |

On the next clock pulse:
a. the memory address register 27 responds to the clear signal and is loaded with the contents of the program counter register 25, that is, from Step 15*a* 0011;
b. the controller register 41 responds to a count-up signal and its contents change to 0001.

Step 22. Because the controller register 41 contains 0001, the register encoder 45 encoder 45 transmits the following signal:

| $F_1$ | $F_2$ | $F_3$ | Clock enable to register: | $F_{1\cdot11}$ | $F_{2\cdot11}$ | $F_{3\cdot11}$ |
|---|---|---|---|---|---|---|
| 111 | | | Program counter | 111 | | |

On the next clock pulse:
a. the program counter register 25 responds to a count-up signal and its contents change to 0100;
b. the controller register 41 responds to a count-up signal and its contents change to 0010.

Step 23. Because the controller register 41 contains 0010, the register encoder 45 transmits the following signal:

| $F_1$ | $F_2$ | $F_3$ | Clock enable to register: | $F_{1\cdot11}$ | $F_{2\cdot11}$ | $F_{3\cdot11}$ |
|---|---|---|---|---|---|---|
| 011 | | | Memory address instruction | 111 | | |

On the next clock pulse:
a. the memory address register 27 responds to the "load X" signal and accepts signals $M_{4-7}$ from memory 16 at the memory address previously selected by the memory address register 27. The memory address register 27 contains, from Step 21*a*, 0011. The signals $M_{4-7}$ in memory at this address are, from TAble 7, 0000;
b. the instruction register 29 responds to the "load X" signal and accepts signals $M_{0-3}$ of the instruction contained in memory at this same address. The bits $M_{0-3}$ in this address from Table 7 are 0000. The instruction register decoder 37 activates the Halt line to disable AND gate 55 (via NAND gate 53), thereby causing the former to inhibit transmission of any further clock pulses from the clock pulse generator 21 to any elements.

The accumulator 31 consequently holds the results of the computation. Similarly, the results of the computation remain applied to the utilization device 18.

Figure 3:
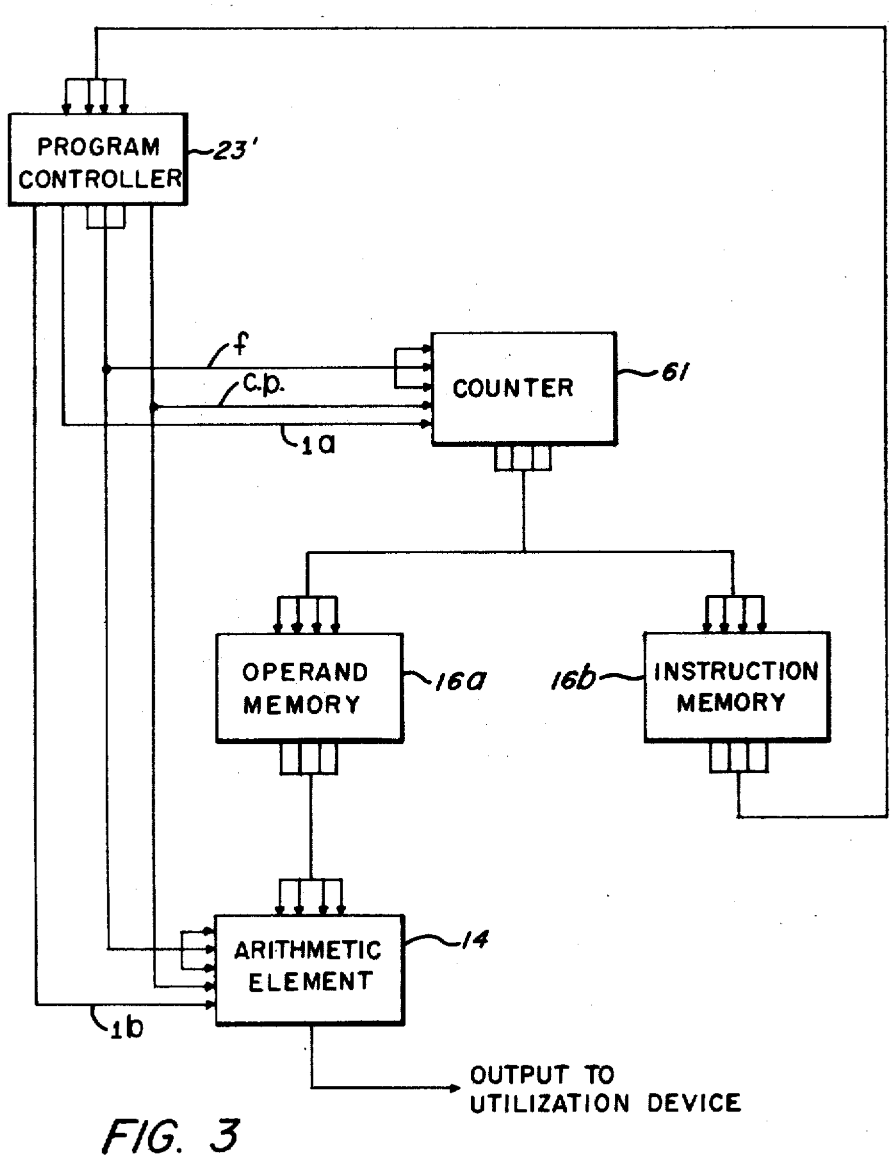
FIG. 3 is a diagram of a digital computer illustrating specifically the method of control contemplated b this invention.

Referring now to FIG. 3, it should be first noted that, because the embodiment there shown is intended to illustrate the contemplated method of controlling a digital computer in its "retrieval" mode, the drawing has been greatly simplified. Thus, for example, the necessary circuitry for entering instruction and operand numbers in memory has not been shown, it being deemed unnecessary here in view of the prior dissertation concerning such entry. Further, other ancillary portions of a computer, here deemed unnecessary for an understanding of the method, are also omitted. For example, the "reset" and "run" control circuitry is omitted from FIG. 3.

The embodiment shown in in FIG. 3 differs from that previously shown in that the memory 16 of FIG. 1 is replaced by an operand memory 16*a* and an instruction memory 16*b*, thus permitting access to addresses in each by operation of a counter 61 (here a Raytheon-type AS-80 module). In the illustrated case, a count of "one" in the counter 61 causes address A of the memories to be queried; a count of "two" causes address B to be queried; a count of "three" causes address C to be queried; and a count of "four" causes address D to be queried. The information at each address to evaluate Equation 1 is as follows:

| Address | Operand memory | Instruction memory |
|---|---|---|
| A | Binary of X | Add (0001). |
| B | Binary of Y | Add (0001). |
| C | Binary of Z | Subtract (0010). |
| D | 0000 | Halt (0000). |

As shown hereinbefore in connection with the description of FIG. 1, the process of adding a desired number to the arithmetic element 14 (which is here indentical to the arithmetic element 14 in FIG. 1) involves three operations: (1) the program controller 23' must have impressed on it a signal (here 0001) which, when processed, sequentially causes; (2) the address of the desired number in the operand memory 16*a* to be found and the number at that address to be presented to the arithmetic element 14; and, (3) the number presented to the arithmetic element 14 to be added to the contents of an accumulator (not here shown) in the arithmetic element 14. In the present embodiment the first two steps just set forth are performed simultaneously. Thus, assuming the counter 61 and the arithmetic element 14 to be reset, actuation of "Run" (not here shown) causes the program controller 23' to produce a function code signal on line *f* (which signal is applied to both counter 61 and arithmetic element 14) to command "count-up," and to enable line $1_a$. It is evident, therefore, that only counter 61 may be actuated under these conditions for the reason that no enable signal is present on line $1_b$ to the arithmetic element 14. Consequently, a clock pulse on the line *c.p.* from the program controller 23' causes the counter 61 to count "one." The number (binary of X) at address A in the operand memory 16*a* is impressed on the arithmetic element 14 and the ADD instruction number (0001) at address A of the instruction memory 16*b* is impressed on the program controller 23'. In the manner described in detail hereinbefore, the program controller 23', in response to an "ADD" instruction, changes its output signals to change the signal on line *f* to "add number on X input," enable line $1_b$ and disable line $1_a$. Thus, the next following clock pulse cannot affect the counter 61 but rather causes the binary of X to be entered into the arithmetic element 14. When the binary of X has been entered, the program controller 23' changes its output to command "count-up" on line *f*, to enable line $1_a$ and to disable line $1_b$. Therefore, the next following clock pulse causes the counter 61 to count "two." Such a count in turn causes the number (binary of Y) at address B in the operand memory 16*a* to be impressed on the arithmetic element 14 and the ADD instruction number (0001) at address B of the instruction memory 16*b* to be impressed on the program controller 23'. The latter element, in response to such instruction signal, changes its output signals to change the signal on line *f* to "add number on X input," enable line $1_b$ and disable line $1_a$. Thus, the next following clock pulse (as described in connection with the entry of the binary of X in the arithmetic element 14) causes the number at address B of the operand memory 16*a* (the binary of Y) to be added to the binary of X and entered in the arithmetic element 14. Having summed the binary of X and the binary of Y, the program counter 23' changes its output signals so that the occurrence of the next following clock pulse causes the counter 61 to count "three." Such count causes line C to be energized, causing the number (binary of Z) at address C in the operand memory 16*a* to be impressed on the arithmetic element 14 and the number at address C of the instruction memory 16*b* (0010, meaning SUBTRACT) to appear at the input of the program controller 23'.

As in the program used heretofore in connection with FIG. 1, the process of subtraction is here chosen to be accomplished by the following routine: (1) complement the number in the arithmetic element 14 (which number is the sum of the binary of X and the binary of Y); (2) add the number at the input to the arithmetic element 14 (the binary of Z); and complement the resulting number. In passing, it is here noted that any other known routine for subtraction may be used without departing from the invention. In any event, it will be obvious that, to complete the routine chosen here, the program controller 23' must, in response to an instruction to SUBTRACT generate the required command signals to cause the arithmetic element 14 to perform the operations COMPLEMENT (meaning complement the sum of the binary of X and the binary of Y), ADD (meaning add the binary of Z to the complement of the sum of the binary of X and the binary of Y) and COMPLEMENT (meaning complement the result of the ADD routine).

It is now clear from the foregoing that the program controller 23' may produce on successive clock pulses the appropriate signals on the line *f*, an enable signal on line $1_b$ (while maintaining line $1_a$ in a disabled state) to accomplish the SUBTRACT routine.

Having accomplished the desired evaluation of Equation 1, it is now necessary to "HALT." This is accomplished here simply by causing the program controller 23' to produce a "-count-up" command on line *f*, and to enable line $1_a$, and to disable line $1_b$. Thus, the counter 61 counts "four," energizing line D. The number at address D of the operand memory 16*a* (here 0000) and the number at address D of the instruction memory 16*b* (0000, meaning HALT) are impressed, respectively, on the arithmetic element 14 and the program controller 23'. The latter element (as shown in connection with FIG. 2) may, without any further routine, inhibit clock pulses from passing to either the counter 61 or the arithmetic element 14. In the absence of clock pulses, neither may change its state. The computer, therefore, stops.

It should be emphasized here again that the particular elements used in a digital computer organized and controlled according to this invention need not be Raytheon-type AS-80 modules. For example, circuits such as are shown by Florida, U.S. Pat. No. 2,998,192, issued Aug. 29, 1961, may be used, provided only that the method of organizing and control herein set forth is followed. As exemplified by FIGS. 1 and 3 in particular, the method encompasses generally the steps of providing, to a plurality of modules (each of which may operate to accomplish any one of a number of different functions) in a digital computer, a common "function" signal and clock pulses, and selectively enabling individual modules in accordance with a predetermined program to process data in a desired way.

While the described embodiments of this invention are useful to an understanding thereof, it will be immediately apparent to those having skill in the art that other embodiments are also covered by the inventive concepts disclosed herein. Thus, it will be apparent that digital computers according to this invention may be constructed to process serial binary numbers rather than parallel binary numbers as illustrated and that, in either case, the chosen 3-bit function code signals may be lengthened or shortened as desired. It is felt, therefore, that the invention should not be restricted to its disclosed embodiments but rather should be limited only by the spirit and scope of the following claims.

I claim:

1. A digital computer utilizing a plurality of integrated circuits, each one thereof being adapted, when enabled, to respond to a function code signal and a clock pulse to process applied digital words in a selected one of a plurality of ways, such computer comprising:

a. a program controller for sequentially producing such function code signals and clock pulses as are required to perform a selected program and, simultaneously with the production of each one of such signals, at least one of a plurality of enable signals;

b. first means for connecting the program controller to each one of the integrated circuits to apply all function code signals and clock pulses from the program controller to each one of the plurality of integrated circuits;

c. second means for connecting the program controller to each one of the integrated circuits to apply, to each one thereof, a different one of the plurality of enable signals;

d. an arithmetic element, including at least one of the integrated circuits, for processing applied digital words;

e. addressable memory means for storing digital signals representative of program instructions and digital words to be processed; and, f. means for interconnecting the addressable memory means with the plurality of integrated circuits and the program controller to actuate the latter with program instructions in accordance with the program to be performed and digital words to the arithmetic element in accordance with such program.

2. A digital computer as in claim 1 wherein the plurality of integrated circuits includes a program counter, a memory address register and an instruction register, the program counter and the memory address register being connected between the program controller and the addressable memory means to select therefrom program instruction signals in order required to perform the selected program and the instruction register being connected between the addressable memory means and the program controller to maintain, at the input to the program controller, each one of such program instruction signals during execution of the operations required to perform each one of such program instruction signals.

3. A digital computer as in claim 2 wherein the program controller includes:

a. a decoder, responsive to each one of the program instruction signals from the instruction register, for producing a control signal indicative of each one of such signals; and b. means, responsive to each control signal, for producing operation control signals corresponding to each such control signal.

4. For use in a digital computer utilizing a plurality of integrated circuits, each one of such circuits being responsive to the application, simultaneously, of a coded function signal, an enabling signal and a clock pulse to perform one of a plurality of functions, the method of controlling each one of such integrated circuits, comprising the steps of:

a. applying a coded function signal and a clock pulse to each one of the plurality of integrated circuits and an enabling signal to a selected one of the plurality of integrated circuits, whereby a single selected one of such integrated circuits is responsive to perform a selected one of the plurality of functions; and, b. thereafter changing the coded function signal applied to each one of such integrated circuits and applying the enabling signal to a different one of the plurality of integrated circuits, whereby a different selected one of such integrated circuits is responsive to perform a different selected one of the plurality of functions.

5. For use in a digital computer wherein program instruction signals and operand signals are stored at predetermined addresses in an addressable memory unit, such signals being sequentially read out of such memory unit in response to signals from a memory address unit and applied, respectively, to a program controller and an arithmetic element, the former producing operation control signals for the memory address unit and the arithmetic element to execute each operation in a predetermined program, the method of controlling the memory address unit and the arithmetic element comprising the steps of:

a. deriving, from the program controller, such coded function signals as are required to execute each successive one of the program instruction signals, together with an enabling signal and a clock pulse corresponding to each one of such operation control signals;

b. applying each successive one of the coded function signals and each clock pulse to the arithmetic element and the memory address unit; and c. selectively applying each enabling signal to the arithmetic element or the address memory unit, thereby selectively to enable such element or unit to execute each operation in the predetermined program.